United States Patent
Weir

(10) Patent No.: US 8,172,309 B1
(45) Date of Patent: May 8, 2012

(54) MAGNETIC EDGER FOR A TRUCK BED

(76) Inventor: Justin Weir, Duncan (CA)

( * ) Notice: Subject to any disclaimer, the term of this patent is extended or adjusted under 35 U.S.C. 154(b) by 0 days.

(21) Appl. No.: 12/851,202

(22) Filed: Aug. 5, 2010

Related U.S. Application Data

(60) Provisional application No. 61/273,412, filed on Aug. 5, 2009.

(51) Int. Cl.
*B60J 7/00* (2006.01)

(52) U.S. Cl. ............... 296/183.1; 296/39.2; 296/57.1

(58) Field of Classification Search ......... 296/183.1, 296/39.2, 57.1
See application file for complete search history.

(56) References Cited

U.S. PATENT DOCUMENTS

| | | | |
|---|---|---|---|
| 3,544,155 A | | 12/1970 | Gardner |
| 4,763,945 A | | 8/1988 | Murray |
| 4,832,396 A | | 5/1989 | Moreno et al. |
| 4,909,559 A | | 3/1990 | Zettle |
| 5,188,407 A | | 2/1993 | Villaveces et al. |
| 5,664,822 A | * | 9/1997 | Rosenfield ............ 296/39.2 |
| 5,904,391 A | * | 5/1999 | Liljenquest et al. ......... 296/57.1 |
| 6,247,742 B1 | | 6/2001 | Boudreaux |
| 6,749,245 B1 | * | 6/2004 | Walker ............ 296/57.1 |
| 7,052,070 B1 | * | 5/2006 | Simonin ............ 296/57.1 |
| 7,290,657 B2 | | 11/2007 | Christensen |
| 2003/0138620 A1 | | 7/2003 | Fonseca |

OTHER PUBLICATIONS

Magnet Material, Rolls, Sheets and Tape in a wide selection. Custom-Magnets.com http://www.custom-magnets.com/ blank_magnets.htm. Accessed Nov. 18, 2008.

Magnetic tape with adhesive in stock and ready to ship. Custom-Magnets.com http://www.custom-magnets.com/magnetic_tape.htm. Accessed Nov. 18, 2008.

* cited by examiner

*Primary Examiner* — Joseph Pape
(74) *Attorney, Agent, or Firm* — Montgomery Patent & Design, LLC; Robert C. Montgomery; Joseph T. Yaksich

(57) ABSTRACT

A magnetic strip device attached across the end of a pick-up truck bed in order to capture loose ferrimagnetic items such as nails, screws, and the like, is herein disclosed. While primarily envisioned for use on pickup trucks, the device can also be used on vans, mini-vans, SUV's, panel trucks, trailers, and other vehicles that are used for hauling and delivering various materials. The device may be mounted to a vehicle using the magnetic attraction of the device or installed in a more permanent manner using threaded fasteners. The device will greatly reduce, if not eliminate loose metallic items from falling off the vehicle and possibly resulting in a safety hazard.

16 Claims, 3 Drawing Sheets

MAGNETIC EDGER FOR A TRUCK BED

RELATED APPLICATIONS

The present invention was first described in and claims the benefit of U.S. Provisional Application No. 61/273,412 filed Aug. 5, 2009, the entire disclosures of which are incorporated herein by reference.

FIELD OF THE INVENTION

The present invention relates generally to motor vehicles, and in particular, to a device particularly adapted for catching magnetic objects.

BACKGROUND OF THE INVENTION

The primary function of motor vehicles is that of powered transportation for persons and objects over laborious distances. In particular, many motor vehicles are especially adapted or intended for the hauling of various types of cargo over long distances. Pickup trucks are an example of one (1) such vehicle. The beds of pickup trucks are particularly well suited for containing materials which are large, unsanitary or otherwise unsuitable for transport in a passenger area of a vehicle, and which are difficult to contain such as large hauls of small or fine materials.

While hauling large volumes of small materials in a pickup truck bed or other motor vehicle, a commonly encountered problem is the spillage of materials during an unloading process. Small objects in particular are prone to flowing out of an intended storage area when opened for access and falling through gaps and cracks such as those found between a pickup truck's bed and tailgate when in an open position.

Various attempts have been made to provide devices which inhibit small materials from entering into gaps or cracks in vehicles. This can be seen by reference to several U.S. patents. U.S. Pat. No. 3,544,155, issued in the name of Gardner, describes a canvas liner attachable to existing side posts in a truck body or the like.

U.S. Pat. No. 4,763,945, issued in the name of Murray, describes a tailgate track mat which provides a flexible continuous barrier between a pickup truck bed and tailgate to prevent granular materials from falling or otherwise accumulating through said gap.

While these devices fulfill their respective, particular objectives, each of these references suffer from one (1) or more of the aforementioned disadvantages. Many such devices are difficult to install. Also, many such devices may inhibit the normal functioning of the tailgate by imposing additional movement restrictions and added resistance to tailgate movement. Furthermore, many such devices are not readily removable or adjustable should they require replacement or should their use not be desired for any reason. Accordingly, there exists a need for a vehicle gap shielding device for particular uses without the disadvantages as described above. The development of the present invention substantially departs from the conventional solutions and in doing so fulfills this need.

SUMMARY OF THE INVENTION

In view of the foregoing references, the inventor recognized the aforementioned inherent problems and observed that there is a need for a means to provide simple and easy attachment and removal of a vehicle gap protection device in scenarios where cumbersome permanent and continuous protection is not required or desired. Thus, the object of the present invention is to solve the aforementioned disadvantages and provide for this need.

To achieve the above objectives, it is an object of the present invention to provide a means to aid in the retention of loose metal items such as nails, screws, staples and the like contained within a vehicle. The device comprises a magnetic strip portion which affixes to an edge portion of a pickup truck bed or other vehicle used for hauling or delivering a load.

Another object of the present invention is to be purchased or modified so as to extend across an entire edge of a vehicle bed.

Yet still another object of the present invention is to provide secure attachment of the device via the magnetism of the integral magnet portion of the device and additionally via a plurality of integral fastening aperture portions.

Yet still another object of the present invention is to provide containment and securement of the magnet portion of the device via an angle bracket with a raised surface portion. The angle bracket is further constructed of a ferromagnetic metal material which allows the magnetism of the protected magnet to securely catch and retain loose metal items such as nails, screws, staples and the like.

Yet still another object of the present invention is to provide features of waterproofing, corrosion resistance and scratch resistance via an external coating.

Yet still another object of the present invention is to provide a method of utilizing the device that provides a unique means of obtaining an instance of the device of a desired appearance and width, cutting the device to a desired width if necessary, positioning the device along an edge of a vehicle bed, holding the device in position via magnetic force of the integral magnet, providing further secure attachment via a plurality of common fasteners and the integral fastener apertures if desired, and providing a means to catch and retain small metal objects before they fall out of the vehicle in an automatic and unobtrusive manner.

Further objects and advantages of the present invention will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

| | |
|---|---|
| 10 | magnetic edger for truck beds |
| 15 | magnet |
| 20 | angle bracket |
| 25 | raised surface |

-continued

| | |
|---|---|
| 30 | coating |
| 40 | fastening aperture |
| 45 | common fastener |
| 47 | adhesive layer |
| 50 | metal item |
| 100 | vehicle |
| 110 | vehicle bed |
| 120 | vehicle tailgate |

DETAILED DESCRIPTION OF THE PREFERRED EMBODIMENT

Figure 1:
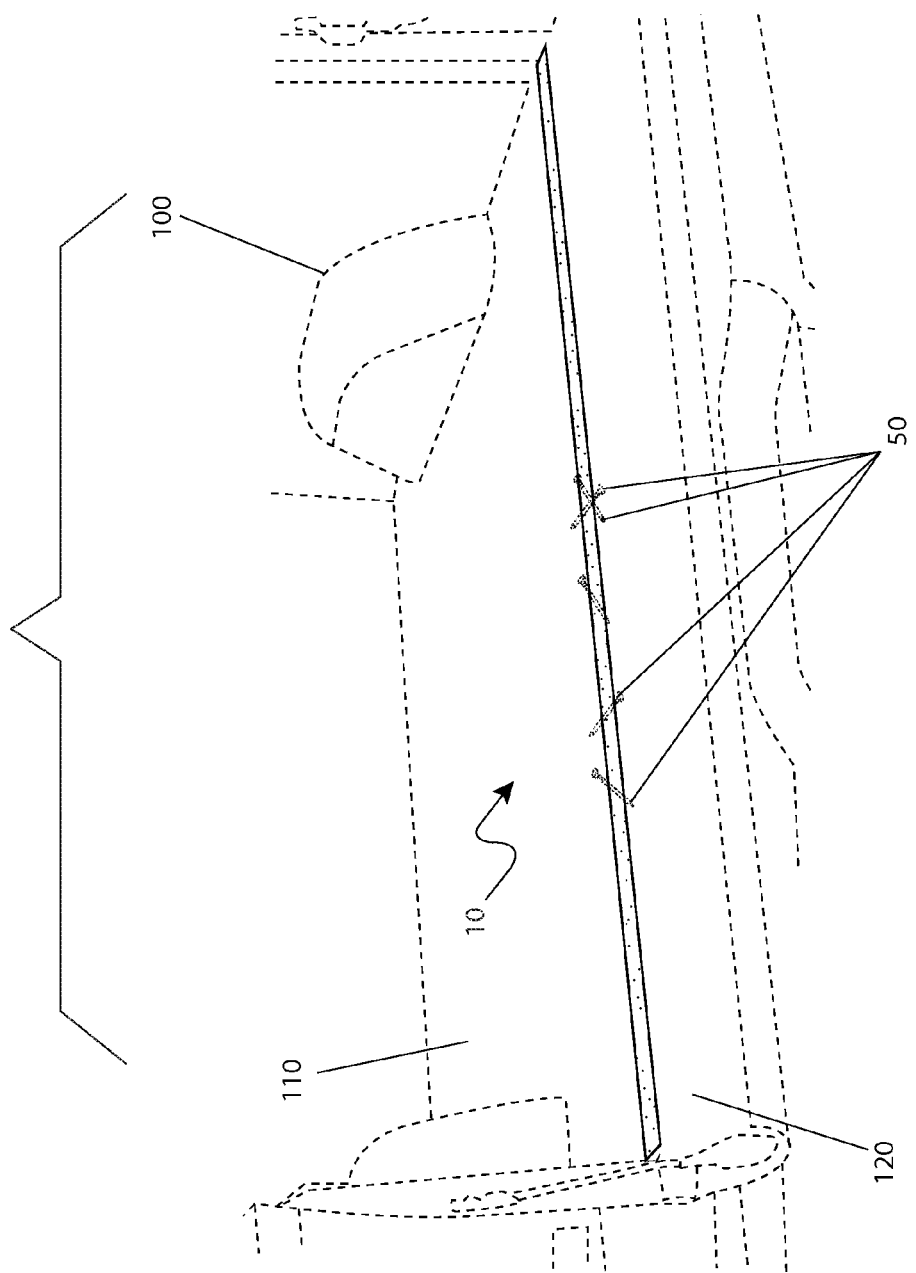
FIG. 1 is an environmental view of a magnetic edger for truck beds 10, according to a preferred embodiment of the present invention.
Figure 2:
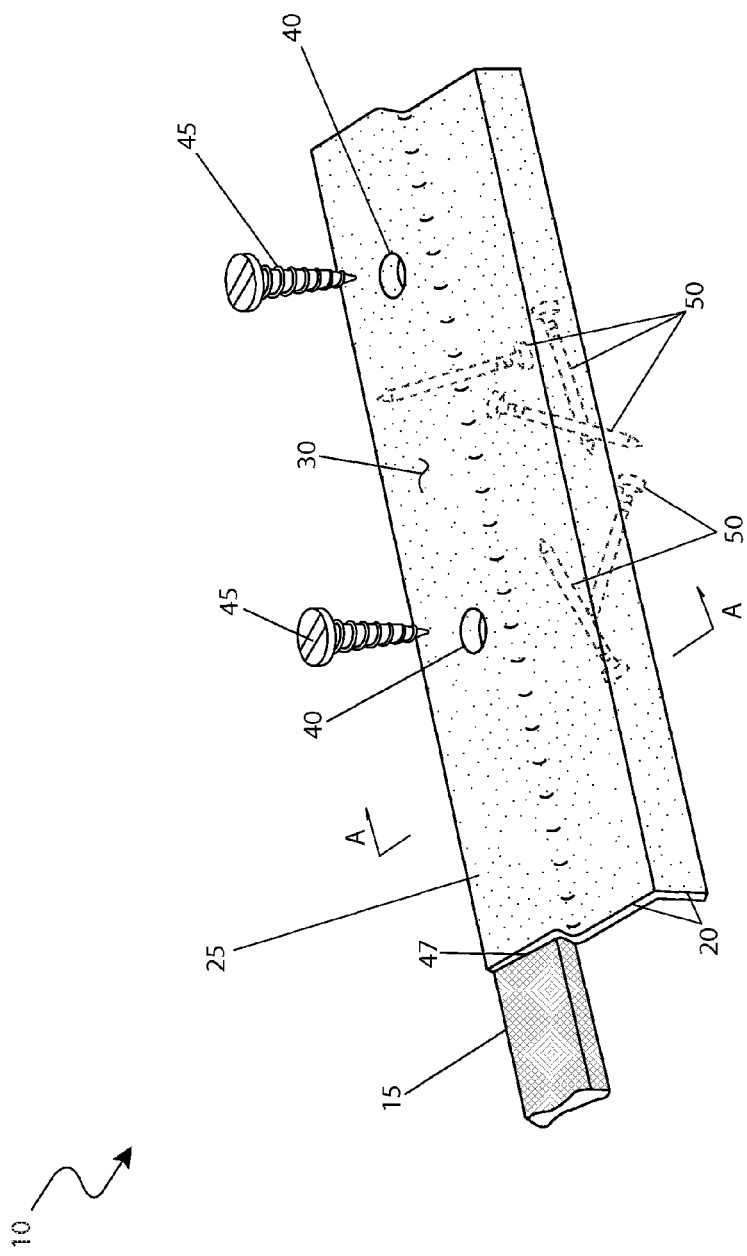
FIG. 2 is a partial cut-away view of a portion of the magnetic edger for truck beds 10, according to a preferred embodiment of the present invention; and, FIG. 3 is a section view of the magnetic edger for truck beds 10 taken along section line A-A (see FIG. 2), according to a preferred embodiment of the present invention.
Figure 3:
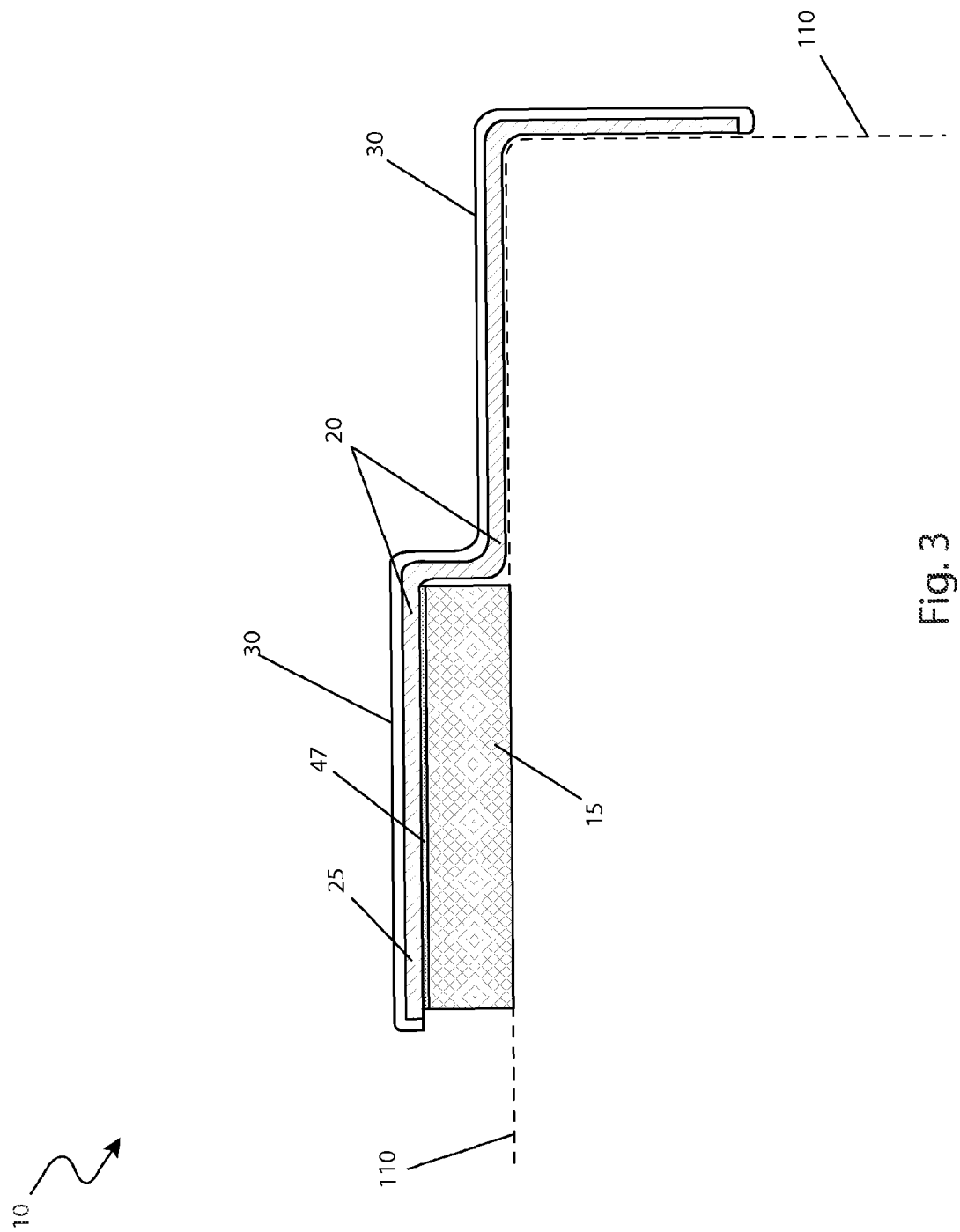

The best mode for carrying out the invention is presented in terms of its preferred embodiment, herein depicted within FIGS. 1 through 3. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a magnetic edger for truck beds (herein described as the "device") 10, which provides a magnetic strip affixed thereto a rear edge portion of a vehicle bed 110, such as a pick-up truck bed, providing a means to capture loose metal 50 items such as nails, screws, staples, and the like. Although the device 10 is primarily envisioned for use on pickup truck-type vehicles 100, the device 10 can also be used on vans, mini-vans, SUV's, panel trucks, trailers, and other vehicles 100 that are used for hauling and delivering a load. The device 10 provides a means to reduce or eliminate said sharp metal items 50 from falling from the vehicle 100 and onto a road surface, and possibly causing a safety hazard.

Referring now to FIG. 1, an environmental view of the device 10, according to the preferred embodiment of the present invention, is disclosed. The device 10 is to be installed upon a vehicle 100 being positioned laterally across a bottom rearward opening of a vehicle bed portion 110 so as to catch loose ferromagnetic metal items 50 such as nails, screws, staples, and the like, as they approach or fall through an adjacent opening typically found between said vehicle bed 110 and a vehicle tailgate portion 120. A length of the device 10 is to be purchased or modified so as to extend across the entire rearward edge of the vehicle bed 110. The device 10 has an approximate thickness of one-half (½) inch and an approximate width of two (2) inches. The device 10 may be held in place against said truck bed 110 by magnetism which is generated by an integral magnet 15 or may be also fastened thereto the vehicle bed 110 for a more secure attachment using common fasteners 45 such as screws, bolts, or the like, being inserted through integral fastening aperture portions 40 which extend through a top surface portion of the device 10. The device 10 is envisioned to be introduced in multiple lengths in one (1) foot increments which may be cut to length by a user, if desired, to produce a proper fit on all makes and models of vehicles 100.

Referring now to FIG. 2, a partial cut-away view of a portion of the device 10, according to the preferred embodiment of the present invention, is disclosed. The device 10 comprises a magnet 15, an angle bracket 20, a waterproof coating 30, and a plurality of fastening apertures 40. The angle bracket 20 comprises a ferromagnetic metal material such as carbon steel being formed in at a right angle having a top surface approximately two (2) inches in width and a rearward vertical face approximately one (1) inch in height. The top surface portion of the device 10 further comprises a linear raised surface portion 25 which contains and protects a subjacent elongated permanent magnetic 15. Said magnet 15 comprises a rectangular cross section and is to be approximately one-quarter (¼) inch in thickness being affixed to the angle bracket 20 using an adhesive 47 (see FIG. 3). The device 10 further comprises a waterproof, corrosion-resistant, and scratch-resistant coating 30 made using a material such as, but not limited to: sprayed-on latex, a bonded plastic layer, a rubberized layer, or the like, which is envisioned to be provided in a variety of attractive colors to match exterior portions of the vehicle 100. However, it is understood that for manufacturing or cost purposes, the device 10 may also be introduced having a painted or plated exterior surface as well without deviating from the concept and as such should not be interpreted as a limiting factor of the device 10.

Referring now to FIG. 3, a section view of the device 10 taken along section line A-A (see FIG. 2), according to a preferred embodiment of the present invention, is disclosed. The angle bracket 20 further comprises a raised top surface portion 25 along a forward edge being approximately one (1) inch in width. Said raised surface 25 discreetly contains and protects the subjacent elongated permanent magnetic 15 being affixed thereto an underside surface of said angle bracket 20 using a thin layer of industrial adhesive 47 preferably being of a suitable composition capable of efficiently conducting magnetism from said magnet 15 to the angle bracket 20.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the device 10, it would be installed as indicated in FIG. 1.

The method of installing and utilizing the device 10 may be achieved by performing the following steps: purchasing the device 10 having a desired color coating 30 and a particular length to enable the device 10 to extend across an entire width of the vehicle bed 110; cutting said device 10 to a desired length, if needed, to provide a proper fit across said vehicle bed 110 using a saw-type tool; positioning the device 10 along a rearward edge region of the vehicle bed 110 such that the vertical portion of the angle bracket 20 extends in a downward manner across the end surface of the vehicle bed 110; allowing the magnetic force of the device 10 to hold said device 10 in position in a portable manner or semi-permanently affixing the device 10 to the vehicle bed 110 by pre-drilling holes into said vehicle bed 110 in a pattern which corresponds to the integral fastening apertures 40; fastening the device 10 thereto the vehicle bed 110 using the integral fastening apertures 40 and provided fasteners 45 using a common screwdriver; and, benefiting from effective capturing of metal items 50 before falling from the vehicle 100 by using the present invention 10.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A device installed within a gap between a tailgate and a truck bed, comprising:
    an elongated body;
    a magnetic strip bonded to said elongated body; and,
    a fastening means for fastening said elongated body to said truck bed;
    wherein said device is installed so as to be positioned laterally across a rearward edge of said truck bed such that a portion depends downwardly through said gap and flush against said truck bed; and,
    wherein said device captures metallic items and prevents said metallic items from falling through said gap.

2. The device of claim 1, wherein said elongated body further comprises a ferromagnetic angle bracket formed at a right angle having:
    a top surface, further comprising a linear raised portion coextensive with a width of said top surface; and,
    a rearward vertical face downwardly depending from and monolithically formed with said top surface;
    wherein said rearward vertical face forms a portion of said device that downwardly depends through said gap when said device is fastened to said truck bed.

3. The device of claim 2, further comprising a length with a minimum of four feet;
    wherein said length is customizable to accommodate a width of said truck bed.

4. The device of claim 3, wherein said length is variable in one foot increments.

5. The device of claim 2, wherein said magnet further comprises a permanent magnetic elongated body adhesively bonded to an underside surface of said linear raised portion of said top surface;
    wherein said magnet provides at least a portion of said fastening means.

6. The device of claim 5, wherein said magnet further comprises a thickness of approximately one-quarter inch.

7. The device of claim 2, wherein said fastening means further comprises a plurality of equidistantly spaced apertures located on said top surface, each receiving a mechanical fastener to fasten said device to said truck bed.

8. A device installed within a gap between a tailgate and a truck bed, comprising:
    an elongated body, further comprising a coating;
    a magnetic strip bonded to said elongated body; and,
    a fastening means for fastening said elongated body to said truck bed;
    wherein said device is installed so as to be positioned laterally across a rearward edge of said truck bed such that a portion depends downwardly through said gap and flush against said truck bed; and,
    wherein said device captures metallic items and prevents said metallic items from falling through said gap.

9. The device of claim 8, wherein said elongated body further comprises a ferromagnetic angle bracket formed at a right angle having:
    a top surface, further comprising a linear raised portion coextensive with a width of said top surface; and,
    a rearward vertical face downwardly depending from and monolithically formed with said top surface;
    wherein said rearward vertical face forms a portion of said device that downwardly depends through said gap when said device is fastened to said truck bed.

10. The device of claim 9, wherein said coating further comprises a waterproof, corrosion-resistant, and scratch-resistant material.

11. The device of claim 10, wherein said material further comprises one of the following: a sprayed-on latex layer, a bonded plastic layer, or a rubberized layer.

12. The device of claim 10, further comprising a length with a minimum of four feet;
    wherein said length is customizable to accommodate a width of said truck bed.

13. The device of claim 12, wherein said length is variable in one foot increments.

14. The device of claim 10, wherein said magnet further comprises a permanent magnetic elongated body adhesively bonded to an underside surface of said linear raised portion of said top surface;
    wherein said magnet provides at least a portion of said fastening means.

15. The device of claim 13, wherein said magnet further comprises a thickness of approximately one-quarter inch.

16. The device of claim 10, wherein said fastening means further comprises a plurality of equidistantly spaced apertures located on said top surface, each receiving a mechanical fastener to fasten said device to said truck bed.

* * * * *